(No Model.)
F. L. SHUNK.
NUT LOCK.
No. 580,230.  Patented Apr. 6, 1897.
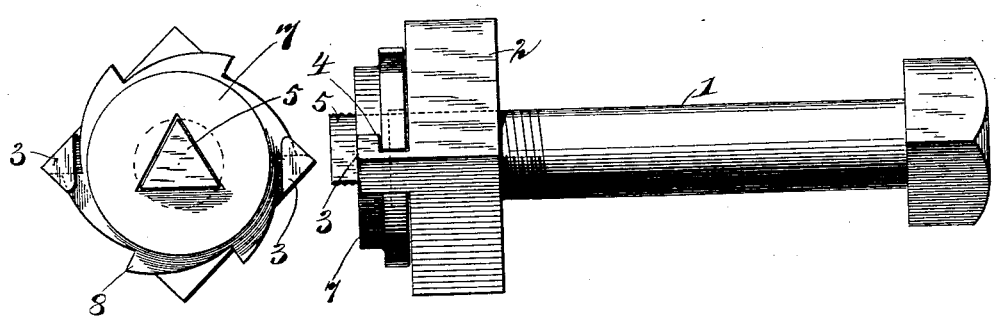
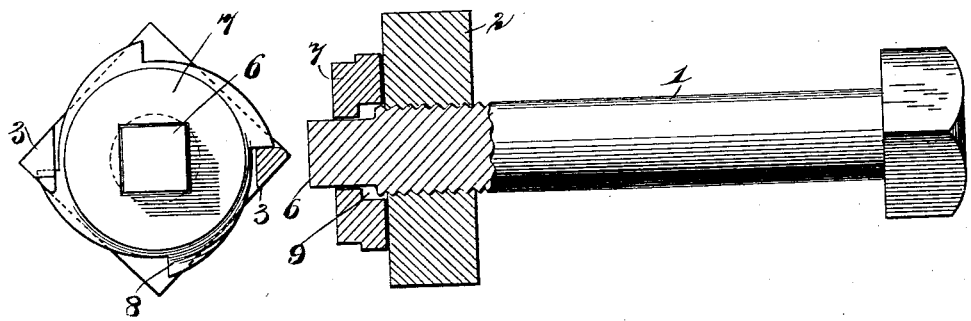
WITNESSES:
L. N. Legendre
C. R. Fergusson
INVENTOR
F. L. Shunk
BY
ATTORNEYS.

UNITED STATES PATENT OFFICE.

FRANK L. SHUNK, OF GRANTSDALE, MONTANA.

NUT-LOCK.

SPECIFICATION forming part of Letters Patent No. 580,230, dated April 6, 1897.

Application filed July 2, 1896. Serial No. 597,811. (No model.)

*To all whom it may concern:*

Be it known that I, FRANK L. SHUNK, of Grantsdale, in the county of Ravalli and State of Montana, have invented new and useful Improvements in Nut-Locks, of which the following is a full, clear, and exact description.

This invention relates to devices for locking nuts to bolts to prevent their accidental disengagement from the same; and the object is to provide a lock that may be quickly adjusted and having means to prevent its disengagement from the end of the bolt.

I will describe a nut-lock embodying my invention and then point out the novel features in the appended claim.

Reference is to be had to the accompanying drawings, forming a part of this specification, in which similar characters of reference indicate corresponding parts in all the views.

Figure 1 is a front view of a nut-lock embodying my invention. Fig. 2 is an edge view thereof, showing its connection with the bolt and nut. Fig. 3 is an end view showing a slight modification, and Fig. 4 is a sectional view thereof.

Referring to the drawings, 1 designates a bolt having the usual thread formed at its end to engage the nut 2. The outer face of the nut 2 is provided with outwardly-extended lugs 3, which are undercut, as plainly shown in Fig. 2, to form a shoulder 4. I have shown two of these lugs arranged one opposite the other, but it is to be understood that a single lug will answer the purpose, and therefore I do not confine my invention to employing two lugs.

The end of the bolt 1, projecting beyond the outer face of the nut 2, is made angular in cross-section. In Fig. 1 I have shown the end 5 as triangular in cross-section, and in Fig. 3 I have shown the end 6 as square in cross-section. Loosely mounted on this projected end is a disk 7, which of course has an opening through it corresponding with the angular end of the nut. The periphery of the disk 7 is provided with a series of ratchet-teeth 8. There may be any desired number of these ratchet-teeth, and preferably when the device is used in connection with small bolts and nuts the ratchet-teeth will be placed quite near together. The under side of the disk 7 is provided with a recess 9, which surrounds the angular opening through the disk and is designed to engage over the threaded end of the bolt should the same project through the nut, as indicated in Fig. 4.

In operation the nut 2 is to be turned tight on the bolt, and then the disk 7 is to be placed thereon with its ratchet-teeth as near as possible to the lugs 3. Then by slightly loosening the nut the lugs will be turned into engagement with the teeth of the locking-disk, the said teeth engaging underneath the shoulder portion 4 of the lugs. By this arrangement it will be seen that the nut will be prevented from outward movement, and the shoulders of the lugs 3 will also prevent an outward movement of the disk 7.

The corners of the angular extensions may be screw-threaded, as indicated in Fig. 2, to engage the nut 2 should said nut project over a portion of the extension, and thus materially strengthen the hold of the nut.

Having thus described my invention, I claim as new and desire to secure by Letters Patent—

In a nut-lock, the combination with a bolt having an angular extension at its end, of a nut provided with a lug projecting from its outer face parallel with the bore thereof, said lug being notched or recessed adjacent to the nut, and a washer provided with an angular opening to fit upon the angular extension of the bolt, a recess on the inner face around the opening thereof and of a greater diameter than the bolt to receive the threaded outer end of the said bolt when it projects through the nut, and ratchet-teeth projecting radially from its periphery one of which is adapted to enter the notch or recess of the lug to lock the washer in contact with the nut and the nut on the bolt, substantially as herein shown and described.

FRANK L. SHUNK.

Witnesses:
CASSIUS M. DOUCETT,
GEORGE C. HOLMAN.